(12) United States Patent
Yungers

(10) Patent No.: US 7,443,362 B2
(45) Date of Patent: Oct. 28, 2008

(54) SOLENOID ANTENNA

(75) Inventor: Christopher R. Yungers, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 202 days.

(21) Appl. No.: 11/184,633

(22) Filed: Jul. 19, 2005

(65) Prior Publication Data

US 2007/0020969 A1 Jan. 25, 2007

(51) Int. Cl.
*H01Q 1/36* (2006.01)
(52) U.S. Cl. .................................... 343/895; 343/702
(58) Field of Classification Search .............. 343/702, 343/741, 787, 788, 866, 867, 895; 340/572.7, 340/572.5, 10.1; 235/462.46
See application file for complete search history.

(56) References Cited

U.S. PATENT DOCUMENTS

| | | | |
|---|---|---|---|
| 5,095,357 A | | 3/1992 | Andoh et al. |
| 6,107,970 A | * | 8/2000 | Holshouser et al. ......... 343/702 |
| 6,268,796 B1 | * | 7/2001 | Gnadinger et al. ....... 340/572.5 |
| 6,388,628 B1 | | 5/2002 | Dettloff et al. |

FOREIGN PATENT DOCUMENTS

| | | |
|---|---|---|
| DE | 196 48 883 A1 | 5/1998 |
| EP | 1484816 A1 * | 12/2004 |
| WO | WO 00/05675 A1 | 2/2000 |
| WO | WO 02/089157 A1 * | 11/2002 |
| WO | WO 03/098532 A1 | 11/2003 |
| WO | WO 2004/059563 A1 | 7/2004 |

OTHER PUBLICATIONS

International Search Report. Jan. 22, 2007.*
Patent Abstracts of Japan. Publication No. 2003-318633, Nov. 2003. Application No. 2002-124093, filed Apr. 2002.*
Chi-Chang lin et al., "Design of a 900/1800 MHz Dual-Band LTCC Chip Antenna for Mobile Communications Applications," Microwave Journal, 5 pages, Jan. 2004.
Brian Davidson et al., "MID Wide Band Helix Antenna for PDC Diversity," 6 pages.
B. Davidson et al., "MID Wide Band Helix Antenna for PDC Diversity," Molded Interconnect Devices, MID '98, 6 pgs.
Y. Lee, "Antenna Circuit Design for RFID Applications," Microchip Technology Inc., Application Note AN710, 50 pgs.

(Continued)

*Primary Examiner*—Michael C Wimer
(74) *Attorney, Agent, or Firm*—John A. Burtis

(57) ABSTRACT

The invention relates to a volumetrically efficient solenoid antenna fabricated on or within a substrate, such as a printed circuit board. The antenna may be used in many applications requiring a short-range wireless communication or sensing link, such as RFID systems, badge readers, contactless connectors, proximity sensors, and short-range data links. The antenna may be, for example, fabricated on or within a printed circuit board of an RFID reader, thereby enabling a perpendicular orientation of the RFID reader with respect to the z-axis of an RFID tag, where the x-y axes are the length and width of the tag. This perpendicular orientation enables the user to point or aim the RFID reader directly at the RFID tag for efficient information transfer between the reader and a single tag in a multiple tag environment.

27 Claims, 6 Drawing Sheets

OTHER PUBLICATIONS

Y. Lee, RFID Coil Design, Microchip Technology Inc., Application Note AN678, 1998, 21 pgs.

N. Chomnawang, "Surface Micromachined Arch-Shaped On-Chip 3-D Solenoid Inductors for High-Frequency Applications," Society of Photo-Optical Instrumentation Engineers, vol. 2, No. 4, Oct. 2003, pp. 275-281.

C.S. Lin et al., "A Deep Submicrometer CMOS Process Compatible High-Q Air-Gap Solenoid Inductor With Laterally Laid Structure," IEEE Electron Device Letter, vol. 26, No. 3, Mar. 2005, pp. 160-162.

F.W. Grover, "Inductance of Single-Layer Coils on Rectangular Winding Forms," *Inductance Calculations*, Dover Publications ISBN 0-486-49577-9, Chapter 10, pp. 70-74.

Y.C. Liang et al., "A Concise Process Technology for 3-D Suspended Radio Frequency Micro-Inductors on Silicon Substrate," IEEE Electron Device Letters, vol. 23, No. 12, Dec. 2002, pp. 700-703.

Partial Search Report for International Application No. PCT/US2006/027837.

PCT International Search Report, PCT/US2006/027837.

* cited by examiner

SOLENOID ANTENNA

TECHNICAL FIELD

The invention relates to antenna designs, and more particularly, to antenna designs useful for radio frequency identification systems.

BACKGROUND

Radio frequency identification (RFID) technology has become widely used in virtually every industry, including transportation, manufacturing, waste management, postal tracking, airline baggage reconciliation, and highway toll management. A typical RFID system includes RFID tags, an RFID reader having an antenna, and a computing device. The RFID reader includes a transmitter that may provide energy or information to the tags, and a receiver to receive identity and other information from the tags. The computing device processes the information obtained by the RFID reader. In general, the information received from the tags is specific to the particular application, but often provides identification for an item to which the tag is affixed, which may be a manufactured item, a vehicle, an animal or individual, or virtually any other tangible article. Additional data may also be provided for the article. The tag may be used during a manufacturing process, for example, to indicate a paint color of an automobile chassis during manufacturing or other useful information.

The transmitter outputs RF signals through the antenna to create an electromagnetic field that enables the tags to respond by modulating the received RF signal according to a pre-defined protocol. A conventional tag may be an "active" tag that includes an internal power source, or a "passive" tag that is energized by the field.

The computing device serves as an information management system by receiving the information from the RFID reader, and performing some action, such as updating a database or sounding an alarm. In addition, the computing device serves as a mechanism for writing data into the tags via the transmitter.

Handheld RFID readers provide a portable means of interrogating tags attached to articles. Often times multiple tagged items are co-mingled in close proximity, thereby requiring a user to orient the handheld reader with respect to a specific RFID tag in order to ensure that the response received is only from the specific tag that one seeks to interrogate.

SUMMARY

In general, the invention relates to a volumetrically efficient solenoid antenna fabricated on or within a substrate, such as a printed circuit board. The solenoid antenna may be used in many applications requiring a short-range wireless communication or sensing link, such as RFID systems, badge readers, contactless connectors, proximity sensors, and short range data links. The solenoid antenna may be, for example, fabricated on or within a printed circuit board of an RFID reader, thereby enabling a perpendicular orientation of the RFID reader with respect to the z-axis of an RFID tag, where the x-y axes are the length and width of the tag. This perpendicular orientation enables the user to point or aim the RFID reader directly at the RFID tag for efficient information transfer between the reader and a single tag in a multiple tag environment.

In one embodiment, the invention is directed to a solenoid antenna comprising a first set of circuit traces formed on a first side of a substrate, a second set of circuit traces formed on a second side of the substrate, a set of vias formed through the substrate to electrically connect the first set of circuit traces to the second set of circuit traces, wherein the first set of circuit traces, the second set of circuit traces and the set of vias collectively define an electrically conductive path of the solenoid antenna, and wherein the electrically conductive path defines a coil such that when an electrical current flows through the coil an electromagnetic field is created In another embodiment, the invention is directed to a solenoid antenna comprising a circuit trace that extends along a first side, a first edge, a second side, and a second edge of a substrate to form a coil encircling the substrate.

In another embodiment, the invention is directed to a device comprising a substrate, an electrical circuit formed on the substrate, and a solenoid antenna formed on the substrate and electrically connected to the electrical circuit wherein the solenoid antenna comprises a first set of circuit traces formed on a first side of the substrate, a second set of circuit traces formed on a second side of the substrate, and a set of vias formed through the substrate to electrically connect the first set of circuit traces to the second set of circuit traces.

In another embodiment, the invention is directed to method of creating a solenoid antenna on a substrate. The method comprises forming a first set of circuit traces on a first side of the substrate, forming a second set of circuit traces on a second side of the substrate, and forming a set of vias through the substrate to electrically connect the first set of circuit traces to the second set of circuit traces such that the first set of circuit traces, the second set of circuit traces, and the set of vias collectively define an electrically conductive path of the solenoid antenna.

In another embodiment, the invention is directed to a radio frequency identification (RFID) tag reader comprising a housing, a circuit board within the housing, an RFID reader circuit formed on the circuit board, and a solenoid antenna coupled to the circuit, wherein the RFID reader circuit generates a current through the solenoid antenna to create an electromagnetic field for interrogation of RFID tags, and wherein the solenoid antenna is configured such that the electromagnetic field substantially provides maximum energy transfer to the RFID tags when the circuit board is orthogonal to the RFID tags.

In another embodiment, the invention is directed to a solenoid antenna comprising a first set of circuit traces formed on a substrate, an insulating layer formed on the first set of circuit traces, a second set of circuit traces formed on the insulating layer, and a set of edge connections formed at edges of the insulating layer to electrically connect the first set of circuit traces to the second set of circuit traces, wherein the first set of circuit traces, the second set of circuit traces and the set of edge connections collectively define an electrically conductive path of the solenoid antenna, and wherein electrically conductive path defines a coil such that when an electrical current flows though the coil an electromagnetic field is created.

In another embodiment, the invention is directed to a method of creating a solenoid antenna on a substrate. The method comprises forming a first set of circuit traces on a substrate, forming an insulating layer on the first set of circuit traces, forming a second set of circuit traces on the insulating layer, and forming a set of edge connections at edges of the insulating layer to electrically connect the first set of circuit traces to the second set of circuit traces such that the first set of circuit traces, the second set of circuit traces and the set of edge connections collectively define an electrically conductive path of the solenoid antenna.

In another embodiment, the invention is directed to a system comprising an RFID tag and an RFID reader, the RFID reader including a solenoid antenna that electromagnetically couples to the RFID tag for information transfer between the RFID reader and the RFID tag, wherein the solenoid antenna comprises a set of circuit traces formed on a first side of a circuit board, a second set of circuit traces formed on a second side of the circuit board, and a set of vias formed through the circuit board to electrically connect the first set of circuit traces to the second set of circuit traces, wherein the first set of circuit traces, the second set of circuit traces and the set of vias collectively define an electrically conductive path of the solenoid antenna, and wherein the electrically conductive path defines a coil such that when an electrical current flows through the coil an electromagnetic field is created.

The details of one or more embodiments of the invention are set forth in the accompanying drawings and the description below. Other features, objects, and advantages of the invention will be apparent from the description and drawings, and from the claims.

DETAILED DESCRIPTION

The invention relates to a volumetrically efficient solenoid antenna fabricated on or within a substrate, such as a printed circuit board. The solenoid antenna may be used in many applications requiring a short-range wireless communication or sensing link, such as RFID systems, badge readers, contactless connectors, proximity sensors, and short-range data links. Although the solenoid antenna designs will be described for use in a handheld RFID reader, it shall be understood that the present invention is not limited in this respect, and that the techniques described herein are not dependent upon the particular application in which the solenoid antenna is used.

Figure 1:
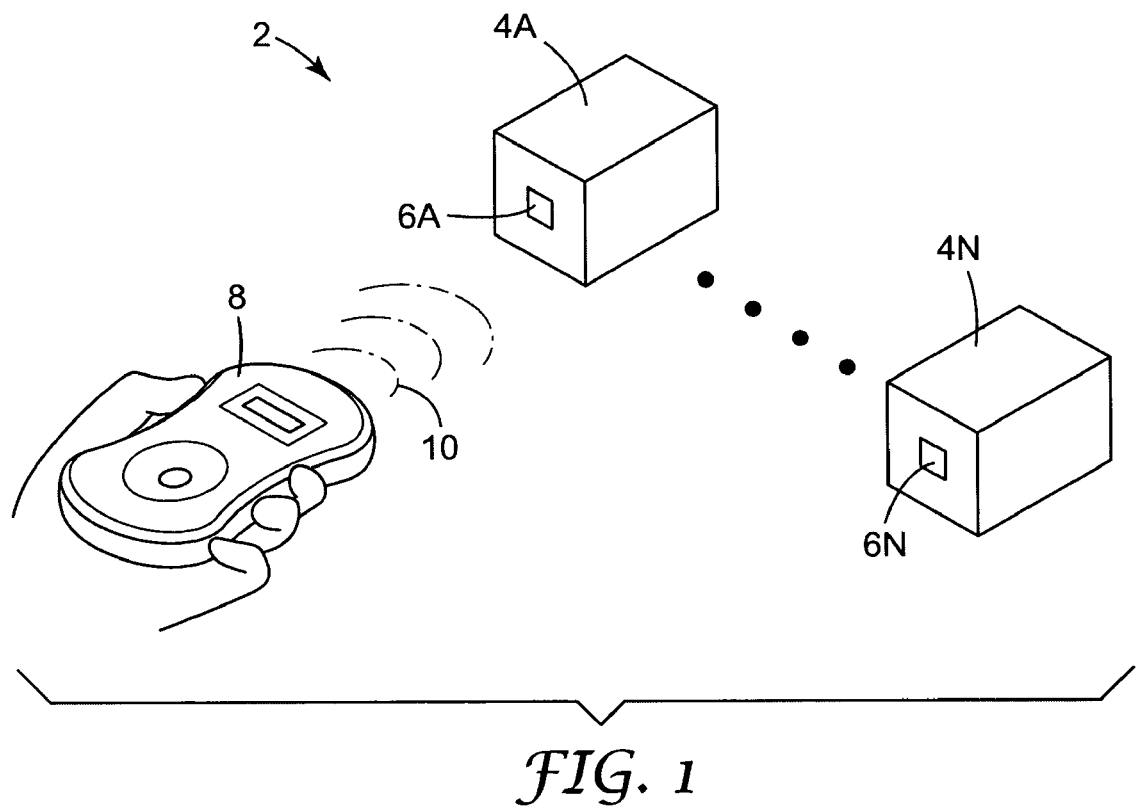
FIG. 1 is a perspective diagram illustrating an exemplary radio frequency identification (RFID) system for locating a plurality of articles.

FIG. 1 is a perspective diagram illustrating an exemplary radio frequency identification (RFID) system 2 for locating a plurality of articles 4A-4N (collectively "articles 4"). Examples of articles 4 to be located include moving boxes, large collections of items such as baseball cards or photos, and items in storage. The placement of an RFID tag 6A on item 4A enables a person to utilize handheld RFID reader 8 to associate a description of item 4A with RFID tag 6A via RF signals 10. The item description and RFID tag identifier value are stored within a database of RFID handheld reader 8. Handheld reader 8 may interface with a personal computer's (PC) data communication port for backing up reader data onto the PC. At a later time, the person utilizes RFID reader 8 to locate one or more items by pointing RFID reader 8 at an RFID tag to determine the article or articles associated with that particular RFID tag. By directly pointing RFID reader 8 at the RFID tag, the reader is oriented perpendicularly to the tag.

Reader-to-tag orientation may affect the efficiency and efficacy of information transfer between an RFID reader and an RFID tag. One method for reading and writing information to RFID tags involves electromagnetically coupling the reader's antenna to the tag's antenna. Once the reader is electromagnetically coupled to the tag antenna, information can be transferred by modulating the coupled electromagnetic field according to an established communication protocol.

As described in detail below, handheld RFID reader 8 contains a solenoid antenna fabricated on or within a substrate of the reader. The electromagnetic field generated by the solenoid antenna enables efficient information transfer between the reader antenna and the tag antenna when the reader antenna is oriented perpendicularly to the tag antenna. Efficient information transfer enabled by the solenoid antenna may provide the user with a more intuitive and ergonomic aiming procedure. Additional advantages may include the ability to fabricate the solenoid antenna with established PCB and multi-layer circuit technologies, which may reduce fabrication costs. In addition, fabricating the solenoid antenna on or within the substrate may also reduce the variability of the solenoid antenna's conductor geometry and spacing, which in turn may reduce the need for supplementary tuning elements. Furthermore, the solenoid antenna may be volumetrically efficient since the height of the solenoid antenna is essentially equivalent to the thickness of the substrate.

In the exemplary embodiment of FIG. 1, RFID reader 8 is enclosed within a housing that is small enough to fit into a user's hand. The housing may be rectangular and generally surrounds a printed circuit board in a manner that properly points the solenoid antenna toward the RFID tag when the user's wrist is in a neutral position, thereby positioning the solenoid antenna to be an extension of the wrist for ergonomic and intuitive aiming at RFID tags attached to articles in an orthogonal orientation with respect to the reader. Accordingly, the user need not be concerned with twisting his wrist into an awkward position for efficient tag interrogation.

Figure 2:
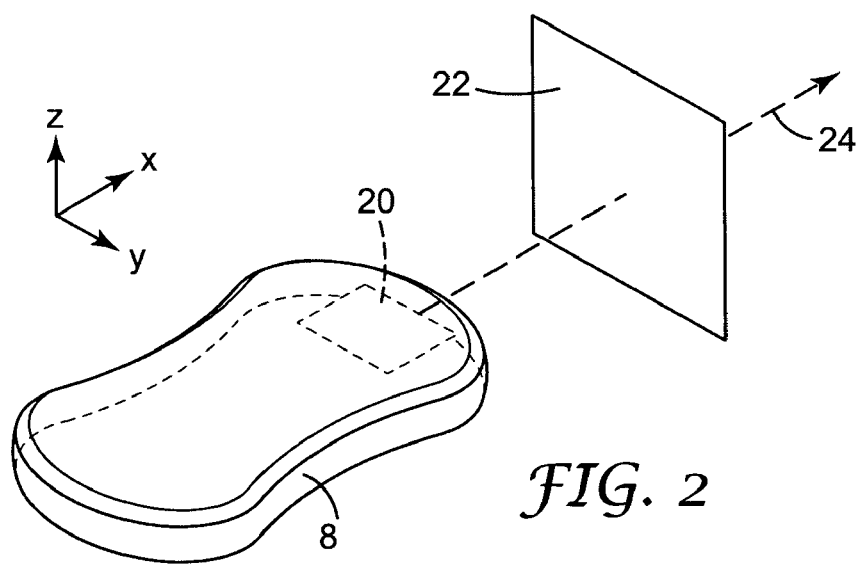
FIG. 2 is a perspective diagram illustrating a perpendicular orientation between a reader and an RFID tag.

FIG. 2 is a perspective diagram illustrating a perpendicular orientation for solenoid antenna 20 of a handheld RFID reader 8 relative to tag 22 associated with an article. Conventional RFID tag antennas typically consist of spiral conductors plated on substrates, or coils of wire wound in a planar loop. Moreover, conventional RFID reader antennas often define similar orientations to tag antennas, requiring axial orientation of the reader to the tag for efficient energy transfer.

A solenoid antenna having circuit traces oriented in the x-y plane of the reader's printed circuit board, as described herein, generates electromagnetic fields 24 for efficient information transfer with perpendicular RFID tag antennas. This allows a user to implement a more intuitive and ergonomic aiming procedure when reading RFID tags.

Figure 3:
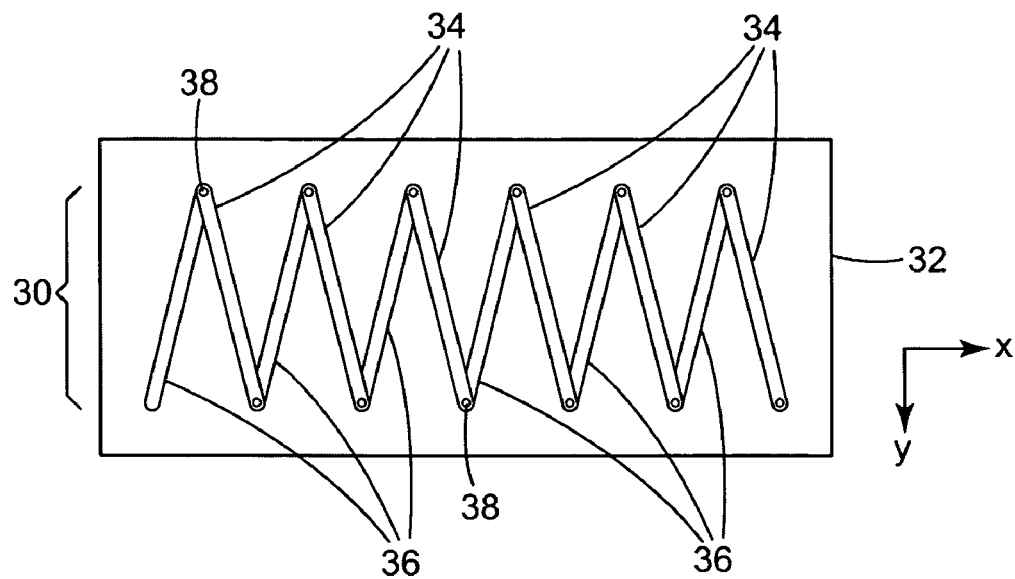
FIG. 3 is a top view of an exemplary printed circuit board with a solenoid antenna according to an embodiment of the invention.

FIG. 3 is a top view of an exemplary printed circuit board with a solenoid antenna according to an embodiment of the invention. Alternatively, solenoid antenna 30 may be fabricated on or within other types of substrates. Examples of alternative substrates include, but are not limited to, semiconductors, ceramics, plastic films and sheets (e.g. polyester), glass, and paper. Solenoid antenna 30 is essentially a thin rectangular solenoid fabricated on or within PCB 32 comprising top conductors 34 and bottom conductors 36. Top conductors 34 are traces within the top surface of PCB 32 and bottom conductors 36 are traces within the bottom surface of PCB 32. As illustrated in FIG. 3, top conductors 34 are substantially parallel to each other, bottom conductors 36 are substantially parallel to each other, and top conductors 34 are non-parallel to bottom conductors 36. The phrase "substantially parallel" is defined herein as being within approximately ten degrees from parallel. Vias 38 (only a subset are labeled in FIG. 3 for simplicity and clarity), located at the end points of each top and bottom conductor, connect top conductors 34 to bottom conductors 36 to complete the coil circuit of thin rectangular solenoid antenna 30. Vias, a term commonly used in PCB fabrication, are typically plated holes running from the top most surface to the bottom most surface of the PCB. More generally, however, vias 38 may be any electrically conductive path between the top and bottom connectors 34, 36. This exemplary embodiment of FIG. 3 contains six top conductor traces and six bottom conductor traces. Other embodiments may be of any number of traces of various trace widths. Accordingly, the invention is not necessarily limited to the exemplary solenoid antenna configuration illustrated in FIG. 3.

Figure 4:
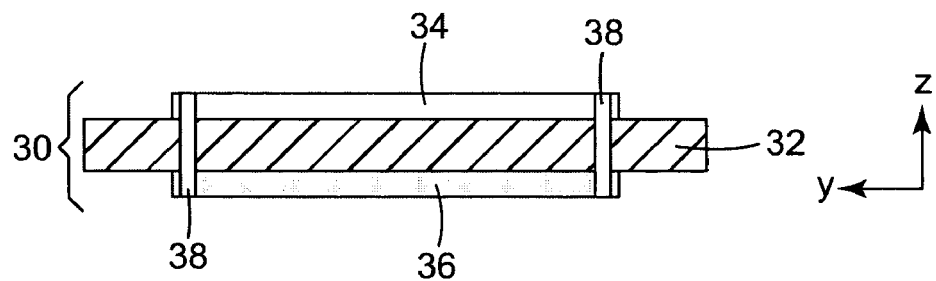
FIG. 4 is a cross-sectional view of an exemplary printed circuit board containing traces on the top and bottom surfaces connected by two vias.

FIG. 4 is a cross-sectional view of an exemplary printed circuit board containing traces on the top and bottom surfaces connected by two vias. PCB 32 contains top conductor 34 connected to bottom conductor 36 by way of vias 38. FIG. 4 illustrates the height of solenoid antenna 30 as being equivalent to the thickness of PCB 32, which may be significantly smaller than a wire wound solenoid soldered to the top surface of PCB 32.

Figure 5:
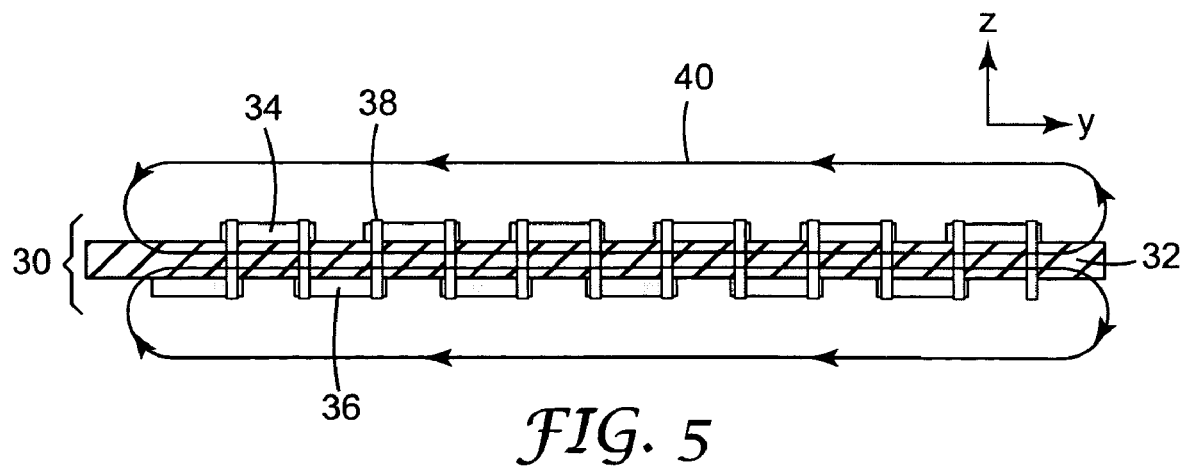
FIG. 5 is a side view of an exemplary printed circuit board with a solenoid antenna.

FIG. 5 is a side view of an exemplary solenoid antenna fabricated on or within a printed circuit board. PCB 32 contains multiple top conductors 34 connected to multiple bottom conductors 36 by way of vias 38 (one of each top conductor 34, bottom conductor 36, and via 38 are labeled in FIG. 5 for simplicity). Electrical current applied to conductors 34 and 36 generates electromagnetic field 40. Electromagnetic field 40 produces sufficient energy to efficiently interrogate RFID tags oriented perpendicular with respect to the RFID reader having solenoid antenna 30. For a given current, the magnitude of electromagnetic field 40 is proportional to the area bounded by the conductors and the vias in the y-z plane of solenoid antenna 30, as is illustrated by the boundary created by top conductor 34, bottom conductor 36, and the two vias 38 depicted in FIG. 4. Again, for a given current, the magnitude of electromagnetic field 40 is also proportional to the square of the number of turns, where a turn in solenoid antenna 30 consists of one top trace and one bottom trace electrically connected with a via.

Figure 6:
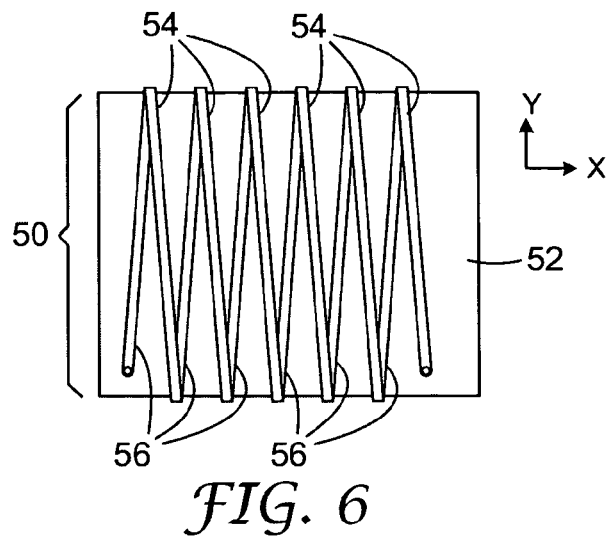
FIGS. 6-8 are top views of an exemplary printed circuit board with a solenoid antenna according to additional embodiments of the invention.

FIG. 6 is a top view of an exemplary printed circuit board with a solenoid antenna according to another embodiment of the invention. Solenoid antenna 50 is essentially a thin rectangular solenoid antenna within PCB 52 comprising top conductors 54 and bottom conductors 56. Top conductors 54 are traces within the top surface of PCB 52 and bottom conductors 56 are traces within the bottom surface of PCB 52. Top conductors 54 and bottom conductors 56 wrap around the edges of the PCB, thereby enabling top conductors 54 to electrically connect to bottom conductors 56 to form one long continuous trace resulting in the coil circuit of thin rectangular solenoid antenna 50. The continuous trace defines multiple revolutions about the PCB, with each of the revolutions being substantially parallel to the other revolutions. As illustrated in FIG. 6, top conductors 54 are substantially parallel to each other, bottom conductors 56 are substantially parallel to each other, and top conductors 54 are non-parallel to bottom conductors 56.

Figure 7:
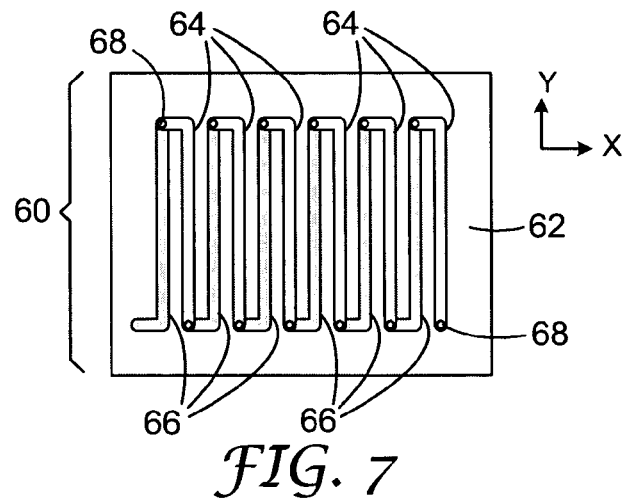

FIG. 7 is a top view of an exemplary printed circuit board with a solenoid antenna according to another embodiment of the invention. In this embodiment, top conductors 64 are substantially parallel to and offset from bottom conductors 66 and both top and bottom conductors are substantially parallel to the two side edges of PCB 62. Top conductors 64 are traces within the top surface of PCB 62 and bottom conductors 66 are traces within the bottom surface of PCB 62. Vias 68 (only a subset are labeled in FIG. 7 for simplicity and clarity), located at the end points of each top and bottom conductor, connect top conductors 64 to bottom conductors 66 to complete the coil circuit of thin rectangular solenoid antenna 60.

Figure 8:
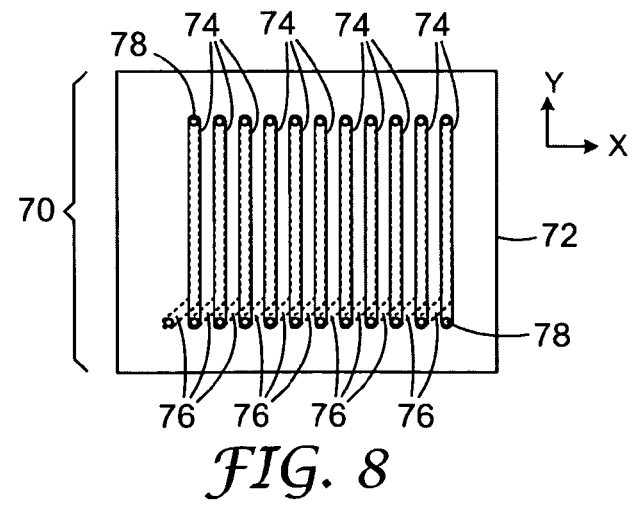

FIG. 8 is a top view of an exemplary printed circuit board with a solenoid antenna according to another embodiment of the invention. In this embodiment, top conductors 74 (which are traces within the top surface of PCB 72) are stacked directly above bottom conductors 76 (which are traces within the bottom surface of PCB 72), such that both the top and bottom conductors are substantially parallel to the two side edges of PCB 72. Vias 78 (only a subset are labeled in FIG. 8 for simplicity and clarity), located at the end points of each top and bottom conductor, connect top conductors 74 to bottom conductors 76 to complete the coil circuit of thin rectangular solenoid antenna 70.

As described above, the previous embodiments comprise conductors deposited on the bottom surface of the substrate, as is typical in lamination processes such as printed circuit technology. In contrast, some processes utilize a stacked layer procedure, such as multi-layer technology, that does not allow conductors to be deposited on the bottom surface of the substrate. In these multi-layer processes, conductors and insulators are deposited in layers on top of a base substrate. Common multi-layer processes include integrated circuits, hybrid circuits, and screen printed conductors on plastic substrates.

Figure 9:
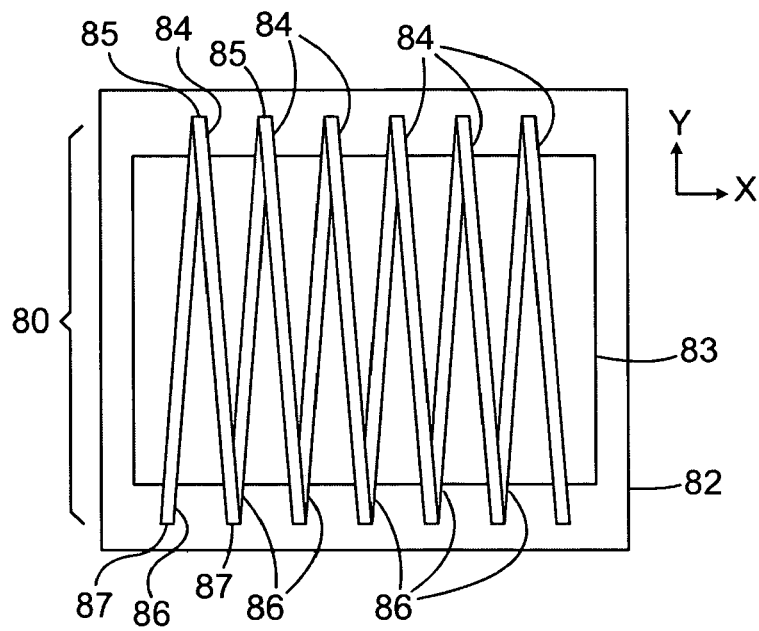
FIG. 9 is a top view of an exemplary solenoid antenna fabricated with multi-layer technology according to one embodiment of the invention.

FIG. 9 is a top view of an exemplary solenoid antenna fabricated on or within a multi-layer substrate according to one embodiment of the invention. First, bottom layer conductors 86 of solenoid antenna 80 are deposited onto base substrate 82. Next, insulating layer 83 is deposited onto bottom layer conductors 86, followed by the deposition of top layer conductors 84 onto insulating layer 83 to complete solenoid antenna structure 80. By overlapping the conductors at the edges, edge connections 85 and 87 (only a subset are labeled in FIG. 9 for simplicity and clarity) complete the electrical connection between top layer conductors 84 and bottom layer conductors 86. Alternatively, vias (not shown in FIG. 9) may be utilized to connect the top conductors to the bottom conductors.

Figure 10:
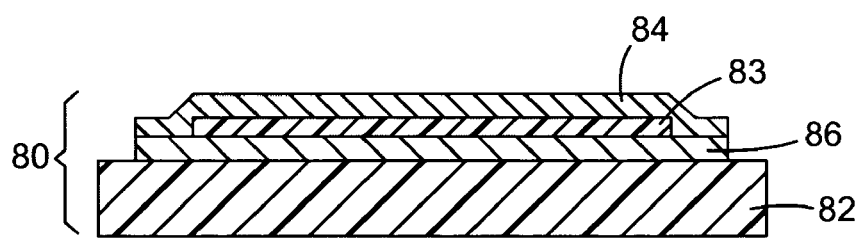
FIG. 10 is a cross-sectional view of the multi-layer substrate illustrated in FIG. 9.

FIG. 10 is an cross-sectional view of the multi-layer substrate illustrated in FIG. 9. First, bottom layer conductors 86 of solenoid antenna 80 are deposited onto base substrate 82. Next, insulating layer 83 is deposited onto bottom layer conductors 86, followed by the deposition of top layer conductors 84 onto insulating layer 83 to complete solenoid antenna structure 80.

In some applications, it may be desirable to utilize a multi-winding solenoid antenna. Conventional multi-winding wire-wound coils are constructed by winding extra layers of wire. In contrast, a multi-winding solenoid antenna is constructed by separating conductor layers with insulating layers and building multiple windings concentrically outward. Multi-winding solenoid antennas may be created with printed circuit or multi-layer technologies.

Figure 11:
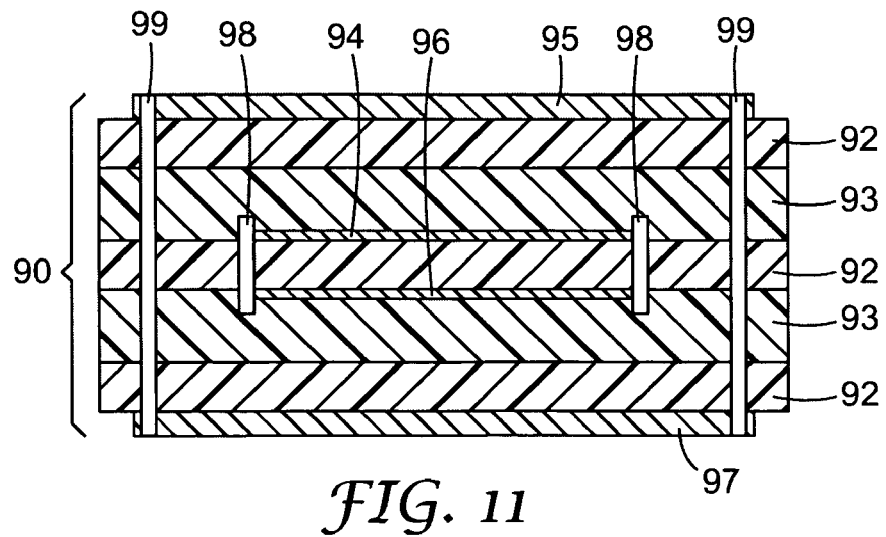
FIG. 11 is a cross-sectional view of an exemplary multi-winding solenoid antenna fabricated with printed circuit technology.

FIG. 11 is an cross-sectional view of an exemplary multi-winding solenoid antenna fabricated with printed circuit technology. Multi-winding solenoid antenna 90 contains an inner winding that comprises conductor substrate 92 having inner top layer conductors 94 connected to inner bottom layer conductors 96 by way of blind vias 98. Blind vias refer to vias which do not extend through the upper layers of a PCB. Multi-winding solenoid antenna 90 also contains an outer winding that comprises outer top layer conductors 95 connected to outer bottom layer conductors 97 by way of vias 99. The inner and outer windings are separated by two insulating layers 93 and two conductor substrate layers 92. This process may be repeated to form as many layered windings as desired.

Figure 12:
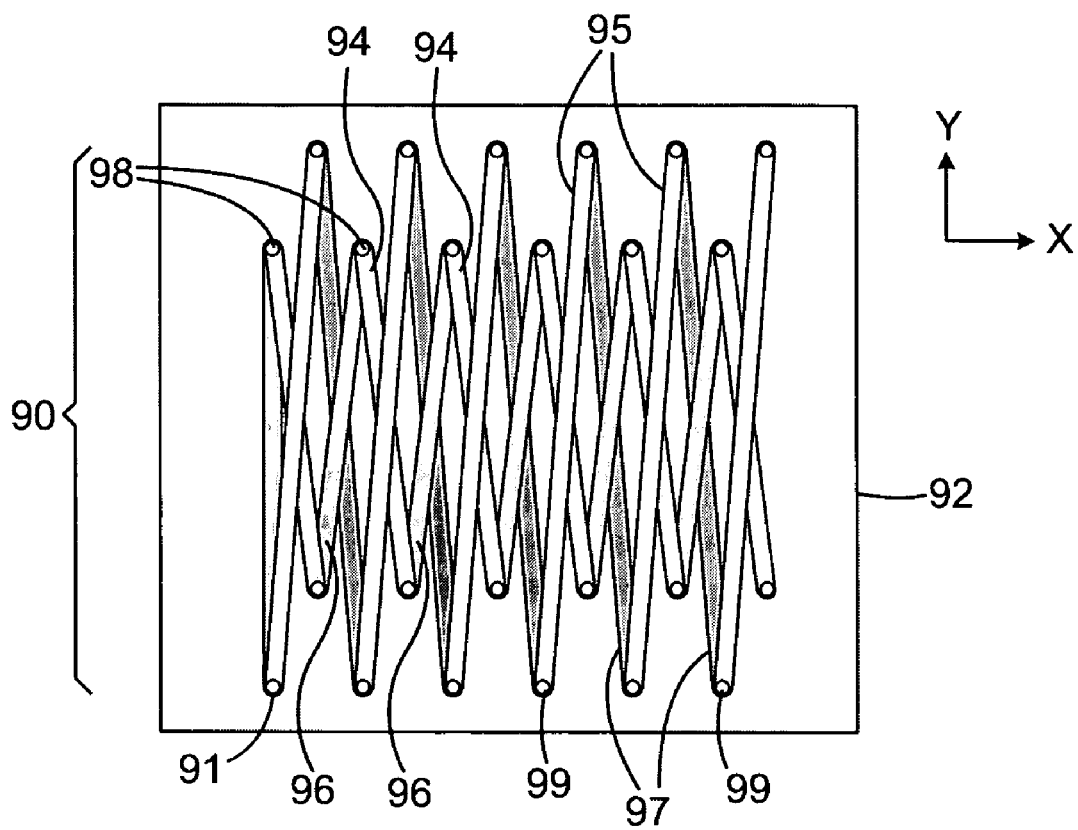
FIG. 12 is a top view of the multi-winding solenoid antenna illustrated in FIG. 11.

FIG. 12 is a top view of the multi-winding solenoid illustrated in FIG. 11. Solenoid antenna 90 is fabricated with printed circuit technology. Only a subset of each of the conductor layers, blind vias, and vias are labeled in FIG. 12 for simplicity and clarity. FIG. 12 illustrates the inner winding (consisting of inner top layer conductors 94, inner bottom layer conductors 96, and blind vias 98) and the outer winding (consisting of outer top layer conductors 95, outer bottom layer conductors 97, and vias 99) formed upon conductor substrate 92. The inner winding is electrically connected to the outer winding to complete the circuit. For example, FIG. 12 illustrates an inner winding to outer winding series connection at connection 91. Alternatively, the windings could be connected in parallel (not shown in FIG. 12).

Figure 13:
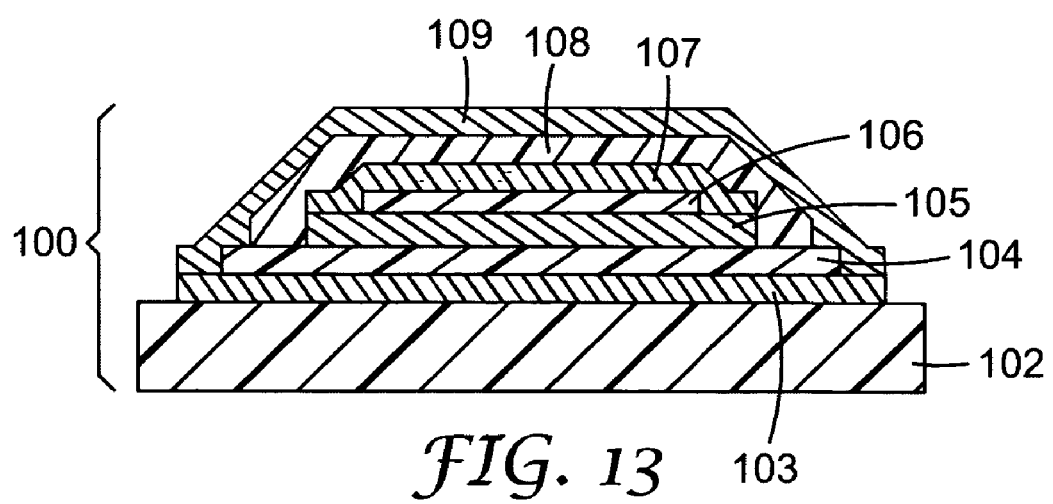
FIG. 13 is a cross-sectional view of an exemplary multi-winding solenoid antenna fabricated with multi-layer technology.

FIG. 13 is a cross-sectional view of an exemplary multi-winding solenoid antenna fabricated with multi-layer technology. As previously described, multi-layer technology may not allow conductors to be deposited on the back side of the substrate. Thus, in multi-layer processes, conductors and insulators are deposited in layers on top of a base substrate. The cross-sectional view of FIG. 13 illustrates the order in which layers are deposited upon base substrate 102 to form multi-winding solenoid antenna 100. First, outer bottom layer conductors 103 are deposited upon base substrate 102, followed by insulating layer 104, and inner bottom layer conductors 105. Next, insulating layer 106 is deposited upon inner bottom layer conductors 105, followed by inner top layer conductors 107, then insulating layer 108, and lastly, outer top layer conductors 109 are deposited upon insulating layer 108 to complete multi-layer stack.

Figure 14:
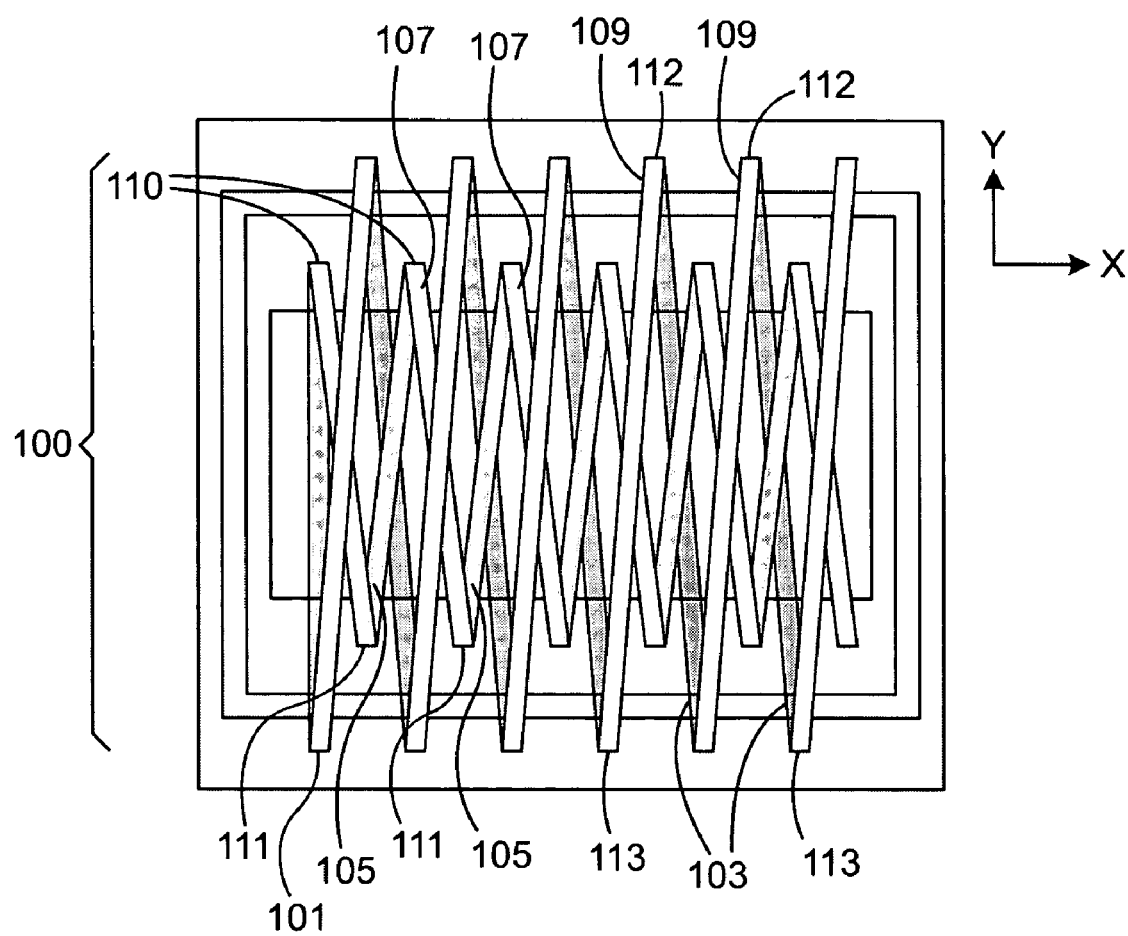
FIG. 14 is a top view of the multi-winding solenoid antenna illustrated in FIG. 13.

FIG. 14 is a top view of the multi-winding solenoid antenna illustrated in FIG. 13. Solenoid antenna 100 is fabricated with multi-layer technology. Only a subset of each of the conductor layers and edges are labeled in FIG. 14 for simplicity and clarity. FIG. 14 illustrates the inner winding (consisting of inner top layer conductors 107, inner bottom layer conductors 105) and the outer winding (consisting of outer top layer conductors 109, outer bottom layer conductors 103) of the multi-winding solenoid antenna. By overlapping the inner layer conductors at the edges, edge connections 110 and 111 complete the electrical connection between inner top layer conductors 107 and inner bottom layer conductors 105. Likewise, by overlapping the outer layer conductors at the edges, edge connections 112 and 113 complete the electrical connection between outer top layer conductors 109 and outer bottom layer conductors 103. Alternatively, vias (not shown in FIG. 14) may be utilized to connect the top conductors to the bottom conductors. The inner winding is electrically connected to the outer winding to complete the circuit. For example, FIG. 14 illustrates an inner winding to outer winding connection at connection 101. Alternatively, the windings could be connected in parallel (not shown in FIG. 14).

Various embodiments of the invention have been described. For example, a volumetrically efficient solenoid antenna has been described. The solenoid antenna may be fabricated on or within a printed circuit board of an RFID reader, thereby enabling a perpendicular orientation of the RFID reader with respect to an RFID tag. This perpendicular orientation enables the user to point or aim the RFID reader directly at the RFID tag for efficient information transfer between the reader and a single tag in a multiple tag environment.

Nevertheless, various modifications may be made to the embodiments described herein. For example, in other embodiments, the same solenoid concept may be used for perpendicular orientation of the RFID reader with respect to an RFID tag without requiring the solenoid antenna to be fabricated on or within a printed circuit board. The solenoid antenna may be fabricated on or within other substrates such as, semiconductors, ceramics, plastic firms and sheets (e.g. polyester), glass, and paper. As another example, the solenoid antenna may include any number of conductors of various widths.

The solenoid antenna design may find applications in other RFID components, such as RFID tags, or other types of readers or devices used in an RFID system. Moreover, the solenoid antenna design may be useful to many other applications requiring a short-range wireless communication or sensing link. Examples of such links include, but are not limited to, badge readers, contactless connectors, proximity sensors, and short-range data links. These and other embodiments are within the scope of the following claims.

The invention claimed is:

1. A solenoid antenna comprising:
 a first set of circuit traces formed on a first side of a substrate;
 a second set of circuit traces formed on a second side of the substrate; and
 a set of vias formed through the substrate to electrically connect the first set of circuit traces to the second set of circuit traces, wherein the first set of circuit traces, the second set of circuit traces and the set of vias collectively define an electrically conductive path of the solenoid antenna, and wherein the electrically conductive path defines a coil such that when an electrical current flows through the coil an electromagnetic field is created,
 wherein the set of vias comprises a first set of vias and the electrically conductive path comprises a first electrically conductive path, the solenoid antenna further comprising a third set of circuit traces, a fourth set of circuit traces, and a second set of vias that electrically connect the third set of circuit traces to the fourth set of circuit traces, wherein the third set of circuit traces, the fourth set of circuit traces and the second set of vias define a second electrically conductive path, wherein the first electrically conductive path is connected to the second electrically conductive path to define the solenoid antenna as a multi-winding solenoid antenna.

2. The solenoid antenna of claim 1, wherein the substrate comprises a circuit board.

3. The solenoid antenna of claim 1, wherein the first set of circuit traces are substantially parallel to each other and the second set of circuit traces are substantially parallel to each other and wherein the first set of circuit traces are non-parallel to the second set of circuit traces.

4. The solenoid antenna of claim 1, wherein the first set of circuit traces are substantially parallel to each other and the second set of circuit traces are substantially parallel to each other and wherein the first set of circuit traces are offset and substantially parallel to the second set of circuit traces.

5. The solenoid antenna of claim 1, wherein the first set of circuit traces are substantially parallel to each other and the second set of circuit traces are substantially parallel to each other and wherein the first set of circuit traces are stacked directly above the second set of circuit traces.

6. A method of creating a solenoid antenna on a substrate comprising:
    forming a first set of circuit traces on a first side of the substrate;
    forming a second set of circuit traces on a second side of the substrate;
    forming a set of vias through the circuit board to electrically connect the first set of circuit traces to the second set of circuit traces such that the first set of circuit traces, the second set of circuit traces and the set of vias collectively define an electrically conductive path of the solenoid antenna; and
    forming a first insulating layer over the first set of circuit traces, forming a second insulating layer over the second set of circuit traces, forming a third set of circuit traces on a second substrate over the first insulating layer, forming a fourth set of circuit traces on a third substrate over the second insulating layer, forming another set of vias through the circuit board to electrically connect the third set of circuit traces to the fourth set of circuit traces, and electrically connecting a single trace of the second set of circuit traces to a single trace of the third set of circuit traces.

7. The method of claim 6, wherein the electrically conductive path substantially defines a coil such that when an electrical current flows through the coil an electromagnetic field is created.

8. The method of claim 6, wherein the first set of circuit traces are formed to be substantially parallel to each other and the second set of circuit traces are formed to be substantially parallel to each other and wherein the first set of circuit traces are formed to be non-parallel to the second set of circuit traces.

9. The method of claim 6, wherein the first set of circuit traces are formed to be substantially parallel to each other and the second set of circuit traces are formed to be substantially parallel to each other and wherein the first set of circuit traces are formed to be offset and substantially parallel to the second set of circuit traces.

10. The method of claim 6, wherein the first set of circuit traces are formed to be substantially parallel to each other and the second set of circuit traces are formed to be substantially parallel to each other and wherein the first set of circuit traces are formed to be stacked directly above the second set of circuit traces.

11. A radio frequency identification (RFID) tag reader comprising:
    a housing:
    a circuit board within the housing;
    an RFID reader circuit formed on the circuit board;
    a solenoid antenna coupled to the RFID reader circuit, wherein the RFID reader circuit generates a current through the solenoid antenna to create an electromagnetic field for interrogation of RFID tags, wherein the solenoid antenna is configured such that the electromagnetic field substantially provides maximum energy transfer to the RFID tags when the circuit board is orthogonal to the RFID tags,
    wherein the housing defines an ergonomic direction for directional tag reading along a plane defined by the circuit board, wherein the electromagnetic field is created to interrogate RFID tags having antennas orthogonal to the plane defined by the circuit board; and
    an actuator formed on the housing to initiate RFID tag reading, wherein the actuator causes the RFID reader circuit to generate the current through the solenoid antenna, wherein the solenoid antenna is configured such that a user can aim and shoot the RFID tag reader for effective RFID tag reading along the plane defined by the circuit board.

12. The RFID tag reader of claim 11, wherein the solenoid antenna comprises a first set of circuit traces formed on a first side of the circuit board, a second set of circuit traces formed on a second side of the circuit board, and a set of vias formed through the circuit board to electrically connect the first set of circuit traces to the second set of circuit traces.

13. The RFID tag reader of claim 11, wherein the solenoid antenna comprises a circuit trace that extends along a first side, a first edge, a second side, and a second edge of a substrate to form a coil.

14. The RFID tag reader of claim 12, wherein the first set of circuit traces, the second set of circuit traces and the set of vias collectively define an electrically conductive path of the solenoid antenna.

15. The RFID tag reader of claim 13, wherein the circuit trace defines an electrically conductive path of the solenoid antenna.

16. The RFID tag reader of claim 12, wherein the first set of circuit traces are substantially parallel to each other and the second set of circuit traces are substantially parallel to each other and wherein the first set of circuit traces are non-parallel to the second set of circuit traces.

17. The RFID tag reader of claim 12, wherein the first set of circuit traces are substantially parallel to each other and the second set of circuit traces are substantially parallel to each other and wherein the first set of circuit traces are offset and substantially parallel to the second set of circuit traces.

18. The RFID tag reader of claim 12, wherein the first set of circuit traces are substantially parallel to each other and the second set of circuit traces are substantially parallel to each other and wherein the first set of circuit traces are stacked directly above the second set of circuit traces.

19. The RFID tag reader of claim 13, wherein the circuit trace defines multiple revolutions about the substrate, wherein each of the revolutions is substantially parallel to the other revolutions on the first side and the second side of the substrate.

20. A solenoid antenna comprising:
    a first set of circuit traces formed on a substrate;
    an insulating layer formed on the first set of circuit traces;
    a second set of circuit traces formed on the insulating layer;
    a set of edge connections formed at edges of the insulating layer to electrically connect the first set of circuit traces to the second set of circuit traces, wherein the first set of circuit traces, the second set of circuit traces and the set of edge connections collectively define an electrically conductive pat of the solenoid antenna, and wherein electrically conductive path defines a coil such that when an electrical current flows though the coil an electromagnetic field is created; and a second insulating layer, a third set of circuit traces, a third insulating layer, a fourth set of circuit traces, a second set of edge connections formed at the edges of the first and third insulating layers, and an electrical connection between at least one trace of the second set of circuit traces and at least one trace of the fourth set of circuit traces collectively forming a multi-winding solenoid antenna.

21. A method of creating a solenoid antenna on a substrate comprising:
forming a first set of circuit traces on a substrate;
forming an insulating layer on the first set of circuit traces;
forming a second set of circuit traces on the insulating layer;
forming a set of edge connections at edges of the insulating layer to electrically connect the first set of circuit traces to the second set of circuit traces such that the first set of circuit traces, the second set of circuit traces and the set of edge connections collectively define an electrically conductive path of the solenoid antenna; and
forming a second insulating layer over the second set of circuit traces, forming a third set of circuit traces over the second insulating layer, forming a third insulating layer over the third set of circuit traces, forming a fourth set of circuit traces over the third insulating layer, forming a second set of edge connections at the edges of the first and third insulating layers, and forming an electrical connection between at least one trace of the second set of circuit traces and at least one trace of the fourth set of circuit traces.

22. The method of claim 21, wherein the electrically conductive path substantially defines a coil such that when an electrical current flows through the coil an electromagnetic field is created.

23. A solenoid antenna comprising:
a first set of circuit traces formed on a first side of a substrate;
a second set of circuit traces formed on a second side of the substrate; and
a set of vias formed through the substrate to electrically connect the first set of circuit traces to the second set of circuit traces, wherein the first set of circuit traces, the second set of circuit traces end the set of vias collectively define an electrically conductive path of the solenoid antenna, wherein the electrically conductive path defines a coil such that when an electrical current flows through the coil an electromagnetic field is created,
wherein the set of vias comprises a first set of vias and the electrically conductive path comprises a first electrically conductive path, the solenoid antenna further comprising a third set of circuit traces, a fourth set of circuit traces, and a second set of vias that electrically connect the third set of circuit traces to the fourth set of circuit traces, wherein the third set of circuit traces, the fourth set of circuit traces and the second set of vias define a second electrically conductive path, wherein the first electrically conductive path is connected to the second electrically conductive path to define the solenoid antenna as a multi-winding solenoid antenna.

24. A method of creating a solenoid antenna on a substrate comprising:
forming a first set of circuit traces on a first side of the substrate;
forming a second set of circuit traces on a second side of the substrate;
forming a set of vias through the circuit board to electrically connect the first set of circuit traces to the second set of circuit traces such that the first set of circuit traces, the second set of circuit traces and the set of vias collectively define an electrically conductive path of the solenoid antenna; and
forming a first insulating layer over the first set of circuit traces, forming a second insulating layer over the second set of circuit traces, forming a third set of circuit traces on a second substrate over the first insulating layer, forming a fourth set of circuit traces on a third substrate over the second insulating layer, forming another set of vias through the circuit board to electrically connect the third set of circuit traces to the fourth set of circuit traces, and electrically connecting a single trace of the second set of circuit traces to a single trace of the third set of circuit traces.

25. A radio frequency identification (RFID) tag reader comprising;
a housing:
a circuit board within the housing;
an RFID reader circuit formed on the circuit board;
a solenoid antenna coupled to the RFID reader circuit, wherein the RFID reader circuit generates a current through the solenoid antenna to create an electromagnetic field for interrogation of RFID tags, wherein the solenoid antenna is configured such that the electromagnetic field substantially provides maximum energy transfer to the RFID tags when the circuit board is orthogonal to the RFID tags,
wherein the housing defines an ergonomic direction for directional tag reading along a plane defined by the circuit board, wherein the electromagnetic field is created to interrogate RFID tags having antennas orthogonal to the plane defined by the circuit board; and
an actuator formed on the housing to initiate RFID tag reading, wherein the actuator causes the RFID reader circuit to generate the current through the solenoid antenna, wherein the solenoid antenna is configured such that a user can aim and shoot the RFID tag reader for effective RFID tag reading along the plane defined by the circuit board.

26. A solenoid antenna comprising:
a first set of circuit traces formed on a substrate;
an insulating layer formed on the first set of circuit traces;
a second set of circuit traces formed on the insulating layer;
a set of edge connections formed at edges of the insulating layer to electrically connect the first set of circuit traces to the second set of circuit traces, wherein the first set of circuit traces, the second set of circuit traces and the set of edge connections collectively define an electrically conductive path of the solenoid antenna, wherein electrically conductive path defines a coil such that when an electrical current flows though the coil an electromagnetic field is created; and
a second insulating layer, a third set of circuit traces, a third insulating layer, a fourth set of circuit traces, a second set of edge connections formed at the edges of the first and third insulating layers, and an electrical connection between at least one trace of the second set of circuit traces and at least one trace of the fourth set of circuit traces collectively forming a multi-winding solenoid antenna.

27. A method of creating a solenoid antenna on a substrate comprising:

forming a first set of circuit traces on a substrate;

forming an insulating layer on the first set of circuit traces;

forming a second set of circuit traces on the insulating layer;

forming a set of edge connections at edges of the insulating layer to electrically connect the first set of circuit traces to the second set of circuit traces such that the first set of circuit traces, the second set of circuit traces and the set of edge connections collectively define an electrically conductive path of the solenoid antenna; and forming a second insulating layer over the second set of circuit traces, forming a third set of circuit traces over the second insulating layer, forming a third insulating layer over the third set of circuit traces, forming a fourth set of circuit traces over the third insulating layer, forming a second set of edge connections at the edges of the first and third insulating layers, and forming an electrical connection between at least one trace of the second set of circuit traces and at least one trace of the fourth set of circuit traces.

* * * * *

UNITED STATES PATENT AND TRADEMARK OFFICE
CERTIFICATE OF CORRECTION

PATENT NO. : 7,443,362 B2  Page 1 of 1
APPLICATION NO. : 11/184633
DATED : October 28, 2008
INVENTOR(S) : Christopher R. Yungers It is certified that error appears in the above-identified patent and that said Letters Patent is hereby corrected as shown below:

Title Page
Item [56], References Cited, Col. 2, OTHER PUBLICATIONS, Delete "Apr." and insert -- Apr. 25, --, therefor.
Item [56], References Cited, Col. 2, OTHER PUBLICATIONS, Before "50" insert -- 2003, --.
Item [56], References Cited, Pg. 2, Col. 1, OTHER PUBLICATIONS, Delete "Shaped" and insert -- Shape --, therefor.

Column 2
Line 9, After "created" insert -- . --.
Line 55, Delete "though" and insert -- through --, therefor.

Column 10
Line 67, In Claim 20, Delete "pat" and insert -- path --, therefor.

Column 11
Line 2, In Claim 20, Delete "though" and insert -- through --, therefor.
Line 47, In Claim 23, Delete "end" and insert -- and --, therefor.

Column 12
Line 21, In Claim 25, Delete ";" and insert -- : --, therefor.
Line 56, In Claim 26, Delete "though" and insert -- through --, therefor.

Signed and Sealed this

Twenty-second Day of December, 2009

David J. Kappos
*Director of the United States Patent and Trademark Office*